United States Patent [19]

Bauer et al.

[11] Patent Number: 4,881,723
[45] Date of Patent: Nov. 21, 1989

[54] DOUBLE-DAMPED GAS SPRING WITH FRICTION LINER AND SEALING RING

[75] Inventors: Hans J. Bauer; Hans-Peter Bauer; Ludwig Stadelmann, all of Altdorf, Fed. Rep. of Germany

[73] Assignee: Fritz Bauer + Sohne oHG, Altdorf, Fed. Rep. of Germany

[21] Appl. No.: 179,502

[22] Filed: Apr. 8, 1988

[30] Foreign Application Priority Data

Aug. 3, 1985 [DE] Fed. Rep. of Germany ....... 3527997

[51] Int. Cl.⁴ .................... F16F 5/00; F16F 9/36; F16F 11/00
[52] U.S. Cl. .................... 267/64.12; 128/376; 188/271; 267/129
[58] Field of Search ............... 188/271, 272, 281, 282, 188/284, 300, 322.15, 322.19, 322.22, 322.18, 316, 317; 267/120, 129, 64.11, 124, 64.15, 64.12; 296/56, 57 A, 57.1; 16/66, 84; 362/401, 402; 277/DIG. 6, 228; 280/711; 128/376, 395, 396

[56] References Cited

U.S. PATENT DOCUMENTS

| | | | |
|---|---|---|---|
| 2,369,007 | 2/1945 | Beecher | 188/271 |
| 2,369,008 | 2/1945 | Beecher | 188/271 |
| 2,912,069 | 11/1959 | Dillenburger | 188/322.18 |
| 2,964,424 | 12/1960 | Mast | 277/DIG. 6 |
| 3,148,888 | 9/1964 | Clark et al. | 277/DIG. 6 |
| 3,472,798 | 10/1969 | Pitchforth et al. | 277/DIG. 6 |
| 3,833,248 | 9/1974 | Wossner et al. | 188/282 X |
| 3,909,087 | 9/1975 | Cairns | 277/DIG. 6 |
| 4,066,279 | 1/1978 | Kaptanis | 267/120 X |
| 4,079,925 | 3/1978 | Salin | 267/129 |
| 4,089,512 | 3/1978 | Allinquant et al. | 267/64.11 |
| 4,156,523 | 5/1979 | Bauer | 267/120 |
| 4,165,085 | 8/1979 | Persson | 277/228 |
| 4,186,261 | 1/1980 | Sprey | 277/DIG. 6 |
| 4,240,619 | 12/1980 | Wirges et al. | 267/129 |
| 4,307,875 | 12/1981 | Schnitzius et al. | 188/282 X |
| 4,438,833 | 3/1984 | Schafer | 188/322.15 X |
| 4,508,201 | 4/1985 | Axthammer et al. | 188/322.18 |
| 4,650,165 | 3/1987 | Siemann | 188/300 X |
| 4,660,561 | 4/1987 | Nielsen | 128/396 X |
| 4,729,458 | 3/1988 | Bauer et al. | 188/322.22 X |

FOREIGN PATENT DOCUMENTS

| | | |
|---|---|---|
| 2019134 | 11/1971 | Fed. Rep. of Germany ...... 188/129 |
| 2421007 | 11/1975 | Fed. Rep. of Germany . |
| 2555062 | 6/1977 | Fed. Rep. of Germany . |
| 8502121 | 5/1985 | Fed. Rep. of Germany . |
| 3503482 | 8/1986 | Fed. Rep. of Germany ...... 128/396 |

Primary Examiner—Robert J. Oberleitner
Attorney, Agent, or Firm—Browdy and Neimark

[57] ABSTRACT

A gas spring substantially comprises a cylindrical housing, closed on one end, and a piston rod located concentrically in it and extending in a sealed manner from its other end, the piston rod being provided on its end located in the housing with a piston assembly resting on the inner wall of the housing and being guided in a damped manner. In order to attain a relatively broad hysteresis, which is desirable when the gas spring is used for retaining the upper parts of sun-tanning benches or automobile hatchbacks or the like, the piston assembly has a friction damping liner resting against the inner wall of the housing and made of an expanded plastic, which is open-celled and impregnated with lubricant on its friction face resting on the inner wall.

10 Claims, 2 Drawing Sheets

DOUBLE-DAMPED GAS SPRING WITH FRICTION LINER AND SEALING RING

This is a continuation-in-part of our application 06/894,468 filed Aug. 1, 1986, now abandoned without prejudice in favor of the present application.

FIELD OF THE INVENTION

The present invention relates to a gas spring comprising a housing which is substantially cylindrical and closed tightly on one end and a piston rod located concentrically in it and extended out of its other end in a sealed manner. On its end inside the housing, the piston rod is provided with a piston assembly resting on the inner wall of the housing; the piston rod is guided in a damped manner.

BACKGROUND OF THE INVENTION

Gas springs of this type have numerous different damping devices, with which different damping characteristics and hence different extension and retraction speeds are attained. In hatchbacks or trunk lids of motor vehicles, further mechanical clamping devices or hydropneumatic locking devices have been provided so as to assure that in the extended position of the gas spring, that is, with the trunk lid or hatchback raised, or with the hood up, the lid or hood could not fall unintentionally if the pressure in the gas spring should drop.

Gas springs, and even damped gas springs, are usually not used for articles that are intended to be in a position of repose at any level, because counterbalancing is extraordinarily difficult. For such purposes, so-called oil supports are used, which are complicated in structure and in particular require absolutely tight valve plates (see U.S. Pat. No. 4,156,523 and German patent application DE-OS No. 25 55 062).

In this context, it is already known from German utility model DE-GM 85 02 121 to provide a mechanical clamping device for a gas spring, this device being embodied by an arbitrarily infinitely adjustable friction brake. To this end, a friction element of which the pressing force is infinitely variable and which acts elastically upon the piston rod is provided.

A replicable damping can be attained only with difficulty with this kind of clamping device, because of the relatively small surface area of the piston rod. Furthermore, there is the danger that the surface of the piston rod may be damaged, which would cause the gas spring to lose its tight seal.

SUMMARY OF THE INVENTION

It is accordingly the object of the present invention to embody a gas spring of the above generic type such that it has a relatively broad hysteresis.

This object is attained according to the invention by providing the piston assembly with a friction damping liner resting against the inner wall. Friction damping liners that are slightly prestressed radially in this way produce a very accurately defined and always replicable hysteresis, which can be adjusted as needed. For example, it may be in the range between 30 and 120N and preferably in the range between 100 and 120N. Gas springs equipped according to the invention may be used for instance for raising and lowering, and retaining, the upper parts of sun-tanning benches in tanning parlors. The expense involved in making the provisions according to the invention is extraordinarily low. The friction ratios are always precisely defined, because only sliding friction is utilized.

A particularly favourable material for the friction damping liner is disclosed herein. A further provision of the invention assures that the friction face of the friction damping liner that rests on the inner wall of the gas spring housing can be saturated or impregnated with a lubricant, such as oil, so that a lubricated and hence particularly precisely defined friction is attained.

If the friction damping force is intended to be overcome in part or in full, in a predetermined retracted position of the piston rod, then further provisions according to the invention and described herein are very useful.

Further advantages and characteristics of the invention will become apparent from the ensuring detailed description of exemplary embodiments, taken in conjunction with the drawings.

DESCRIPTION OF THE PREFERRED EMBODIMENTS

Figure 1:
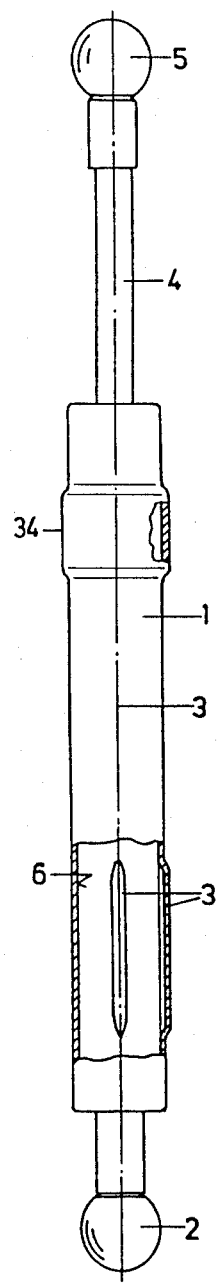
FIG. 1 is a longitudinal view, partially cut away, of a gas spring.

The gas spring shown in the drawing has an approximately cylindrical housing 1, on one end of which a connecting element 2, such as an eye or a member in the form of a spherical segment, is provided. In other words, on this end the housing 1 is tightly closed. On the other end of the housing 1, a piston rod 4 disposed coaxially with the central longitudinal axis 3 of the housing 1 is extended to the outside, and a connecting element 5 is also disposed on its free end. This connecting element 5 may once again be in the form of an eye or a member in the form of a spherical segment. The piston rod 4 is extended out of the housing 1 in a sealed manner, in the usual way. The housing 1 has a cylindrical inner wall 6.

A piston assembly 7 is provided on the inner end of the piston rod 4 and by this means the interior of the housing 1 is divided into two partial housing chambers 8 and 9, the first partial housing chamber 8 being penetrated by the piston rod 4. The two partial housing chambers 8, 9 communicate with one another via the piston assembly 7. They are filled with compressed gas. A small quantity of oil is also present, for purposes of lubrication.

Figure 2:
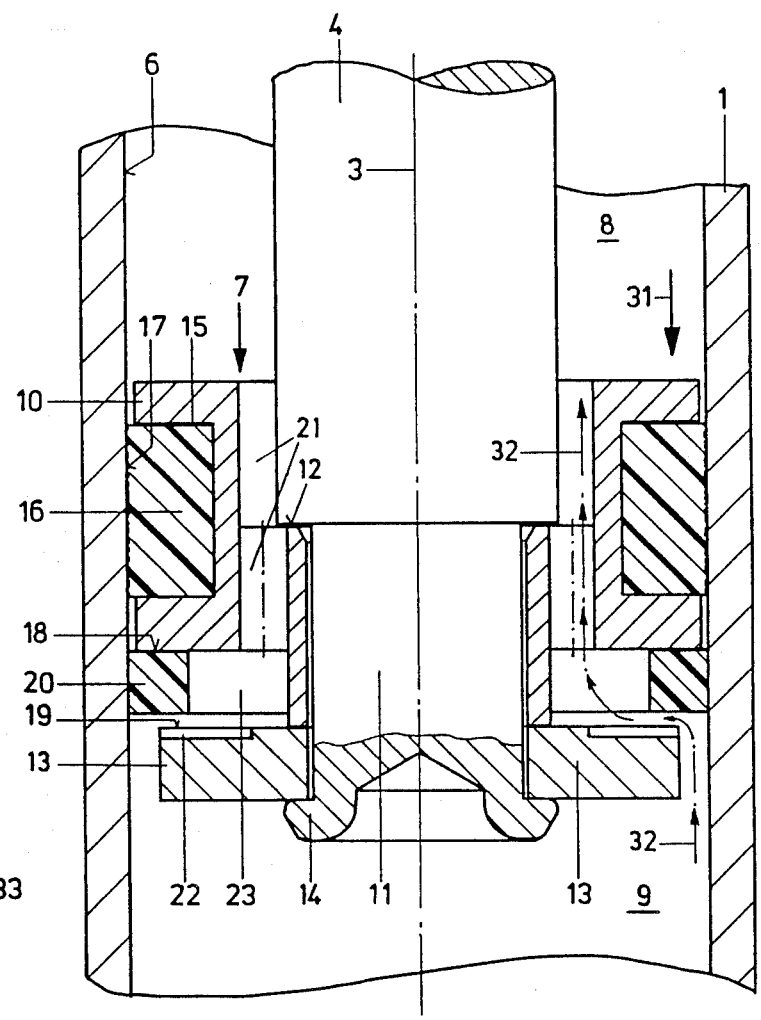
FIG. 2 is a detail of the gas spring, shown on a greatly enlarged scale, showing the friction damping liner according to the invention in the vicinity of the piston assembly.

In the embodiment shown in FIG. 2, the piston assembly 7 has a one-piece annular piston 10, which is disposed on a tapered, tang-like section 11 of the piston rod 4 and is axially fixed in one direction by an annular shoulder or collar 12 between the section 11 and the piston rod 4. On the other side of the piston 10, which serves to provide guidance on the inner wall 6, an annular disk 13 serving as a damping disk is fitted over the section 11. The free end of the section 11 is riveted, so that an annular bead 14 rests against the annular disk 13 and thus fixes the piston 10, along with the annular disk 13, in the other direction, located toward the free end of the piston rod 4. The piston 10 and the annular disk 13 are disposed largely without radial play on the section 11 of the piston rod 4. The predominantly cylindrical piston 10 has an outer diameter that is less by only one- or two-tenths of a millimeter than the inside diameter of the housing 1. As can be seen in FIG. 2, the piston 10 has a generally U-shaped cross-section with a pair of legs extending outwardly and connected together by by an axially extending bottom portion to define an annular cylindrical groove 15. An annular friction damping liner 16, which may be closed in the manner of a circular ring, is disposed in the annular-cylindrical groove 15 of the piston 10, such groove 15 thereby serving as a holding means for the liner 16; alternatively, the friction damping liner 16 may be laid into the groove in the form of a flat, rectangular-block-like strip. This friction damping liner is made of foamed polyurethane. At least in the vicinity of the friction face 17 resting against the inner wall 6, this polyurethane foam material has open cells, or opened cells, so that a small portion of the lubricant located in the housing 1 can be received in them.

At least in its radially outward region, the piston 10 has a bearing face 18 extending radially with respect to the central longitudinal axis 3 and located opposite the end face 19 oriented toward it of the annular disk 13. In the space located between this bearing face 18 and the end face 19, there is a sealing ring 20 disposed resting sealingly against the inner wall 6 of the housing 1, and the extension of this sealing ring in the direction of the central longitudinal axis 3 is shorter than the axial spacing between the bearing face 18 and the end face 19. Channels 21 are formed radially inside the sealing ring 20, extending through the inside of the piston 10 parallel to the axis 3. Radial channels 22 are formed in the end face 19 of the annular disk 13, also extending as far as the chamber 23 located radially inside the sealing ring 20 between the bearing face 18 and the end face 19, the same chamber 23 from which the axial channels 21 also emerge.

In the embodiment of FIG. 2 an asymmetrical pneumatic damping is attained by means of the design of the piston assembly 7 incorporating a valve means. If the piston rod 4 is inserted into the housing 1 in the direction of the arrow 31, then the sealing ring 20 rests against the bearing face 18 of the piston 10—as shown in FIG. 2—so that gas can flow in the direction of the flow arrows 32 between the end face 19 of the annular disk 13 and the sealing ring 20 into the chamber 23, and from there through the axial channels 21 into the partial housing chamber 8.

If the piston rod 4, under the pressure of the gas located in the housing 1, moves out of the housing, or in other words contrary to the directional arrow 31, then the sealing ring 20 rests against the end face 19 of the annular disk 13, so that the gas can flow only through the radial channels 22 from the partial housing chamber 8 into the partial housing chamber 9. Because of the severe cross-sectional reduction in these radial channels 22, a considerable throttling of the gas occurs. The extension movement of the piston rod 4 is accordingly much more greatly damped pneumatically than is its retraction movement.

In the embodiment, friction forces arise between the friction face 17 of the friction damping liner 16 and the inner wall 6 of the housing 1 during displacements of the piston rod 4; those forces are dependent on the type of material of which the damping liner 16 is made, its density, the size of its friction face 17, and its radial biasing. The radial biasing is attained by providing that the friction damping liner 16, prior to insertion into the housing 1, has a greater radial extension than the equivalent of the inside diameter of the housing 1.

Gas springs of this kind, provided with an additional friction damping, can particularly preferably be used whenever the extending force of the gas spring is required as an additional lifting aid, for instance with automobile hoods and trunk lids, for moving the upper part of a tanning bench, and the like. On the other hand, precisely in such applications it is desirable for the hood, lid or upper part of the tanning bench to remain in its position of repose in any intermediate position, or at least in numerous intermediate positions. It is precisely then that the additional friction damping, with a defined or definable value for the friction force, is particularly favorable. In these applications, additional damping forces of between 30 and 120N are typically needed. Such forces are easily attainable in conventional gas springs provided with additional friction damping according to the present invention with an extension force of 400 to 500N under normal conditions (that is, at 20° C.).

If the friction damping is to be reduced or entirely eliminated in any region of the housing 1, then this is attainable by enlarging the diameter of the inner wall 6 of the housing 1. This kind of diameter enlargement can be attained by providing that the housing 1 is given an enlarged inside diameter all the way around, this enlargement being great enough that the biasing of the material making up the friction damping liner 16 is overcome. If only a reduction in the friction damping force is to be attained, then it may for instance be provided that crescent-shaped indentations or grooves 33, extending outwardly from the interior of the housing, such indentations being parallel to the central longitudinal axis 3. These indentations or grooves are pressed into the inner wall 6 of the housing 1, thereby providing a partial diameter enlargement. A diameter enlargement 34 extending over the entire circumference of the housing 1 is also shown in FIG. 1. It must be emphasized expressly that such diameter enlargements 33 and/or 34 may be disposed axially one after the other, so that the friction damping is effected only in relatively short regions located between them.

Figure 3:
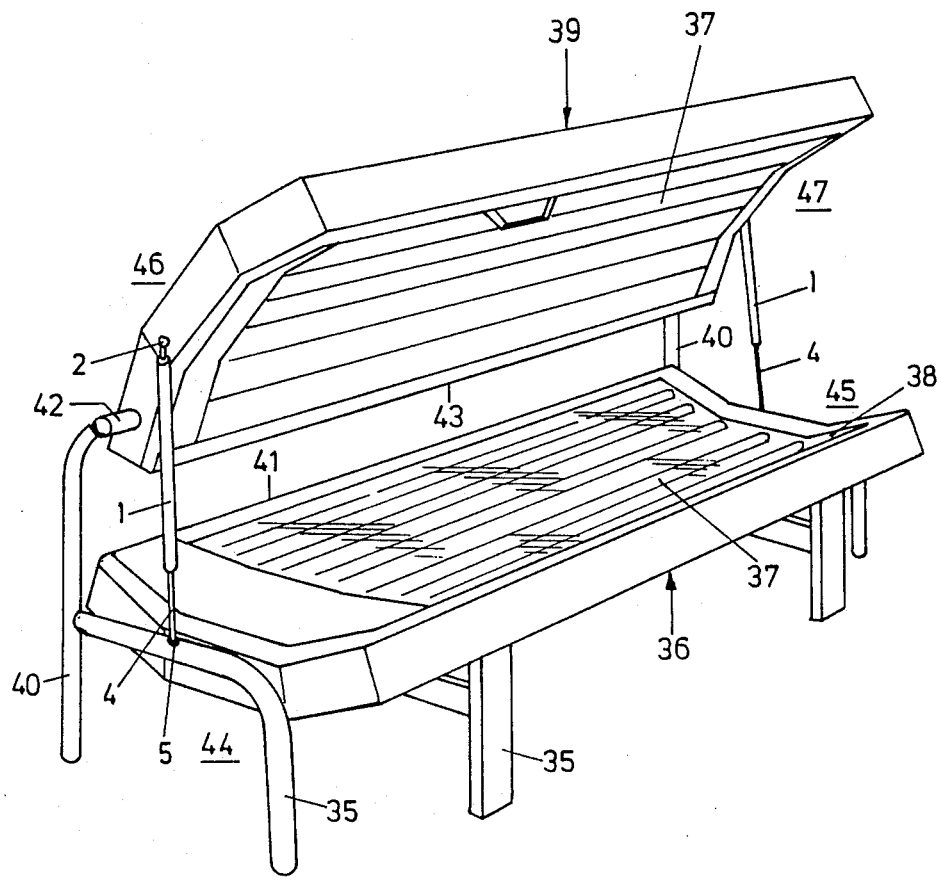
FIG. 3 shows a sun-tanning bench having gas springs according to the invention.

FIG. 3 shows a so-called sun-tanning bench, in which the gas spring according to the invention is used preferably. This sun-tanning bench has a largely plane lower part 36 supported on the ground by means of legs 35, in which lower part 36 fluorescent tubes 37 are arranged generating a light similar to the sunlight. These fluorescent tubes are covered by a translucent plate 38, on which the user can rest. Above the lower part 36 an upper part or lid 39 is provided principally similar in design, in which are equally arranged fluorescent tubes 37 appearing roughly sketched in the drawing. By means of supports 40 this cover-like upper part 39 is propped on the ground and connected with the lower part 36. These supports 40 are arranged adjacent to a longitudinal side 41 of the lower part 36 and connected with the upper part 39 by means of swivel hinges 42 equally adjacent to a longitudinal side 43 of this upper part. When the upper part 39 has been brought into a position essentially parallel to and above the lower part 36, then sufficient place is provided for a user between the lower part 36 and the upper part 39. Since the swivel hinges 42 are in engagement with the upper part 39 adjacent to its longitudinal side 43, measures are necessary in order to avoid that the upper part 39 inadvertently turns down on the lower part 36, which during use might have bad consequences for the user. To this effect two gas springs of the kind according to the invention are provided, which, with their connecting elements 5, each are in engagement with one of the front sides 44 and 45, respectively, approximately in the middle of the lower part 36. The other connecting element 2 is in engagement with the front sides 46 and 47, respectively, in the middle of the upper part or lid 39. The effect of these gas springs as applied in this case has been described above. The sum of the extension forces of both gas springs used essentially corresponds to the part of the weight of the upper part 39 exercised on it. The additional damping forces exercised by the damping means according to the invention serve to ensure that the upper part 39 remains in each position chosen and can yet be changed in height with little effort.

What is claimed is:

1. A gas spring, comprising a substantially cylindrical housing tightly closed at one end and a piston rod disposed concentrically in the housing and extending out of said housing in a sealed manner at the other end of said housing, the piston rod being provided on its end located in the housing with a piston assembly fixed thereto, said piston assembly comprising a sealing ring forming part of a valve means resting on the inner wall of the housing and being guided in a damped manner, wherein
    the piston assembly has a friction damping liner resting against the inner wall of said housing, and
    pneumatic damping means for pneumatically damping said piston assembly, said pneumatic damping means including at least one gas passage channel extending through said piston assembly and the valve means for restricting said channel as said piston assembly moves in a first direction in said housing and for opening said channel as said piston assembly moves in a direction opposite said first direction in said housing;
    said piston assembly including a holding means for retaining said friction damping liner in said piston assembly and against said inner wall of said housing, said holding means further defining at least a portion of the length of said channel;
    said friction damping liner comprising an expanded plastic band of foamed polyurethane impregnated with lubricant and constituting means for producing a damping force of between 30 and 120N in addition to said pneumatic damping.

2. A gas spring as defined by claim 1, wherein the friction damping liner is open-celled, at least in its friction face resting on the inner wall.

3. A gas spring as defined by claim 1, wherein the inner wall of the housing is at least partly enlarged over part of the length of the housing.

4. A gas spring as defined by claim 3, wherein the inner wall of the housing has indentations extending over part of the length of the housing.

5. A gas spring according to claim 1 wherein said pneumatic damping means comprises said sealing ring of said piston assembly, said sealing ring being located between a bearing face (18) of said holding means and an axially spaced end face (19) of said piston assembly, the axial spacing between said bearing face (18) and said end face (19) being greater than the height of said sealing ring whereby said sealing ring is movable therebetween, said sealing ring defining a chamber (23) forming a part of said gas passage channel, and said end face (19) having a series of radial channels (22) formed therein, said radial channel (22) also comprising a part of said gas passage channel, whereby said pneumatic damping means and said friction damping liner are combined in a single unit.

6. A double damped gas spring, comprising a substantially cylindrical housing closed at one end and sealed for the gas-tight passage therethrough of a piston rod at the other end;
    a piston rod disposed concentrically in said housing and extending out through said sealed other end of said housing, said piston rod being provided on its end located in said housing with a piston assembly having a sealing ring fixed to said rod and resting on the inner wall of said housing, said piston assembly dividing the interior of said housing into two variably sized gas-tight chambers, one of said chambers surrounding said piston rod and the other said chamber lying downstream from said piston rod of said piston assembly;
    said piston assembly comprising a one-piece annular piston mounted on said piston rod, said annular piston having a generally U-shaped cross-section with a pair of legs extending outwardly and connected together by an axially extending bottom portion to define an annular-cylindrical groove, said annular piston defining at least one gas passage channel extending from one chamber to the other chamber and lying between the bottom portion of said U-shaped cross-section and said piston rod;
    a friction damping liner disposed within said annular-cylindrical groove and resting against the inner wall of said housing, said friction damping liner comprising a band of open celled polyurethane foam impregnated with lubricant; and
    gas-damping means for providing gas damping to said piston assembly in addition to the friction damping provided by said friction damping liner, said gas damping means comprising a valve for restricting said channel as said piston assembly moves in a first direction in said housing and for opening said channel as said piston assembly moves in a direction opposite said first direction in said housing, said valve comprising said sealing ring disposed resting sealingly against the inner wall of said housing within an axial space provided in said piston assembly which is greater than the height of said sealing ring.

7. A gas spring as defined by claim 6, wherein the inner wall of said housing is at least partially enlarged over part of the length thereof.

8. A construction comprising a lower part (36), a lid adapted to move toward and away from said lower part, and a gas spring having two opposite ends, one said end being connected to said lid and the other end being connected to said lower part, said gas spring comprising
    a substantially cylindrical housing tightly closed at one end and a piston rod disposed concentrically in the housing and extending out of said housing in a sealed manner at the other end of said housing, the piston rod being provided on its end located in the housing with a piston assembly fixed thereto, said piston assembly comprising a sealing ring resting on the inner wall of the housing and being guided in a damped manner, wherein
    the piston assembly has a friction damping liner resting against the inner wall of said housing, and pneumatic damping means for pneumatically damping said piston assembly, said pneumatic damping means including at least one gas passage channel extending through said piston assembly and valve means comprising said sealing ring for restricting said channel as said piston assembly moves in a first direction in said housing and for opening said channel as said piston assembly moves in a direction opposite said first direction in said housing;

said piston assembly including a holding means for retaining said friction damping liner in said piston assembly and against said inner wall of said housing, said holding means further defining at least a portion of the length of said channel;

said friction damping liner comprising an expanded plastic band of foamed polyurethane impregnated with lubricant and constituting means for producing a damping force of between 30 and 120N in addition to said pneumatic damping.

9. A construction according to claim 8 in the form of a sun-tanning bench, said lower part and said lid comprising means for generating light similar to sunlight comprising a plurality of fluorescent tubes.

10. A construction comprising a lower part (36), a lid adapted to move toward and away from said lower part, and a gas spring having two opposite ends, one said end being connected to said lid and the other end being connected to said lower part, said gas spring comprising a substantially cylindrical housing closed at one end and sealed for the gas-tight passage therethrough of a piston rod at the other end;

a piston rod disposed concentrically in said housing and extending out through said sealed other end of said housing, said piston rod being provided on its end located in said housing with a piston assembly having a sealing ring resting on the inner wall of said housing, said piston assembly dividing the interior of said housing into two variably sized gas-tight chambers, one of said chambers surrounding said piston rod and the other said chamber lying downstream from said piston rod of said piston assembly;

said piston assembly comprising a one-piece annular piston mounted on said piston rod, said annular piston having a generally U-shaped cross-section with a pair of legs extending outwardly and connected together by an axially extending bottom portion to define an annular-cylindrical groove, said annular piston defining at least one gas passage channel extending from one chamber to the other chamber and lying between the bottom portion of said U-shaped cross-section and said piston rod;

a friction damping liner disposed within said annular-cylindrical groove and resting against the inner wall of said housing, said friction damping liner comprising a band of open celled polyurethane foam impregnated with lubricant; and gas-damping means for providing gas damping to said piston assembly in addition to the friction damping provided by said friction damping liner, said gas damping means comprising a valve for restricting said channel as said piston assembly moves in a first direction in said housing and for opening said channel as said piston assembly moves in a direction opposite said first direction in said housing, said valve comprising said sealing ring disposed resting sealingly against the inner wall of said housing within an axial space provided in said piston assembly which is greater than the height of said sealing ring.

* * * * *